United States Patent [19]

Chaloner-Gill

[11] Patent Number: 5,445,856
[45] Date of Patent: Aug. 29, 1995

[54] PROTECTIVE MULTILAYER LAMINATE FOR COVERING AN ELECTROCHEMICAL DEVICE

[76] Inventor: Benjamin Chaloner-Gill, 520 Mansion Ct., Santa Clara, Calif. 95054

[21] Appl. No.: 150,634

[22] Filed: Nov. 10, 1993

[51] Int. Cl.$^6$ .......................... B32B 1/08; H01M 2/00
[52] U.S. Cl. .................... 428/35.9; 428/124; 428/323; 428/329; 428/331; 428/347; 428/402; 428/461; 429/163
[58] Field of Search .............. 428/34.1, 35.7, 35.9, 428/36.6, 323, 327, 328, 329, 331, 332, 347, 402, 457, 472.2, 913, 404, 407, 461, 194, 122, 124; 523/200; 524/202, 204, 512, 513; 429/162, 163, 171, 174, 175, 176, 177, 185, 192, 213

[56] References Cited

U.S. PATENT DOCUMENTS

| | | | |
|---|---|---|---|
| 3,117,259 | 1/1964 | Wilson | 317/231 |
| 4,092,464 | 5/1978 | Dey et al. | 429/127 |
| 4,192,773 | 3/1980 | Yoshikawa et al. | 252/429 R |
| 4,332,845 | 6/1982 | Nawata et al. | 428/35 |
| 4,567,121 | 1/1986 | Gilmore | 429/181 |
| 4,615,926 | 10/1986 | Hsu et al. | 428/35 |
| 4,702,966 | 10/1987 | Farrell et al. | 428/500 |
| 4,840,280 | 6/1989 | Schvester | 215/228 |
| 4,856,650 | 8/1989 | Inoue | 206/204 |
| 4,879,190 | 11/1989 | Lundsgaard | 429/94 |
| 4,935,317 | 6/1990 | Fauteux et al. | 429/192 |
| 5,077,111 | 12/1991 | Collette | 428/36.7 |
| 5,143,763 | 10/1992 | Yamada et al. | 428/36.2 |
| 5,153,038 | 10/1992 | Koyama et al. | 428/35.8 |
| 5,274,024 | 12/1993 | Koyama et al. | 524/440 |
| 5,326,652 | 7/1994 | Lake | 429/127 |

*Primary Examiner*—Paul J. Thibodeau
*Assistant Examiner*—Stephen Sand
*Attorney, Agent, or Firm*—Linda Deschere

[57] ABSTRACT

A laminate is provided for use as a protective covering for inhibiting penetration of oxygen or oxygen and water therethrough and is particularly suitable for protecting components of an electrochemical cell such as a lithium battery. The laminate comprises an ionomeric polymeric layer for heat sealing layers of the laminate to one another and at least two flexible polymeric layers, one of which may comprise the ionomeric layer; and an oxygen scavenging agent incorporated in one of the flexible polymeric layers or disposed between any two of the flexible polymeric layers. It is preferred that the laminate be insulating as well for inhibiting transport of electricity as well as oxygen and water through the laminate and comprises two or more polymeric layers having, when combined, the characteristics of flexibility, electrical insulation, adhesiveness, and stability to water.

18 Claims, 2 Drawing Sheets

PROTECTIVE MULTILAYER LAMINATE FOR COVERING AN ELECTROCHEMICAL DEVICE

FIELD OF THE INVENTION

This invention relates to a container for an electrochemical cell which is highly resistant to the penetration of oxygen or oxygen and water to protect the cell from degradation.

BACKGROUND OF THE INVENTION

Batteries, with metallic electrodes, often have a limited life-cycle due to the degradation of the metallic electrodes. For example, lithium is known to be highly reactive in humid air. Therefore, batteries are manufactured in an environment of low humidity and often in a vacuum or protective atmosphere. In use, lithium negative electrodes (anodes) may be attacked and/or passivated by electrolytes and moist air. This results in formation of lithium powder with a very high surface area. This is undesirable because lithium, and especially high surface area lithium, powder react violently with moisture and air. Composite anode alternatives have been suggested to overcome such problems, but they are prone to a large loss of capacity as compared to metallic lithium. Containers for foods, beverages, and drugs often include agents to prevent oxygen attack of the contents therein. U.S. Pat. Nos. 4,840,280 and 4,615,926 are incorporated herein by reference and show typical packaging technology. It is typical to have a headspace above the contents of the package which contains an oxygen scavenger. The scavenger is held in the headspace by a permeable film between the contents and the scavenger. Such construction is not suitable for protecting lithium cells because communication between the scavenger and the cell contents is unacceptable. In another typical container, a multiple film package has peelable layers which permits easy access to the contents. Layers of film which easily separate from one another should never be used for protecting lithium cells because the contents are highly volatile and should never be exposed while in use. Therefore, what is needed is a means for housing electrochemical cell (battery) components and means for preventing exposure and degradation of such components, particularly lithium, over an extended period of battery use.

SUMMARY OF THE INVENTION

A laminate is provided for use as a protective covering for inhibiting penetration of oxygen and/or oxygen and water therethrough and is particularly suitable for protecting components of an electrochemical cell such as a lithium battery. The laminate comprises at least two flexible polymeric layers, one of which may comprise an ionomeric layer for heat sealing layers of the laminate to one another; and an oxygen scavenging agent incorporated in one of the flexible polymeric layers or disposed between any two of the flexible polymeric layers. It is preferred that the laminate be insulating as well for inhibiting transport and transmission of electricity as well as oxygen and water through the laminate and comprises two or more polymeric layers having, when combined, the characteristics of flexibility, electrical insulation, adhesiveness, and stability in the presence of water. An ionomeric polymeric layer may constitute one of the two polymeric layers. However, it is preferred that the ionomeric layer be a third layer forming a heat seal to an opposing ionomeric layer. An oxygen scavenging agent is included in the laminate as described above.

In a preferred embodiment, the container is in the form of a bag or pouch having an opening adaptable to be heat sealed and a peripheral extent with inner and outer surfaces, layers between such surfaces where at least one of the layers comprises the polymeric material which forms a heat seal to itself to seal such opening and wherein the polymeric heat sealing material constitutes the inner layer. In such an arrangement, outer layers, namely layers on the outer side of the inner heat sealing layer, are, an electrically insulating polymeric layer having a resistance greater than about $10^{12}$ ohms; a metal foil layer on one side or the other side of the insulating layer and an outer layer of a durable polymeric material having a tensile strength greater than about 30,000 psi. The electrically insulating layer and the metal foil layer are sandwiched between the durable outer layer and the heat sealable inner layer. The oxygen scavenging compound is disposed between any of the two layers or incorporated in any of the layers. Desirably the electrically insulating layer is a polyolefin and preferably is polyethylene. The exterior layer is desirably a polymeric amide or a polyester and preferably either nylon or polyethylene terephthalate. It is preferred that the metal foil is aluminum. In a preferred embodiment the laminate which forms the container is constituted by seven layers arranged from interior layer (the layer facing the contents of the container) to exterior layer (the surface facing the environment and away from the contents). The layers are: heat sealable layer of ionomer; olefin based adhesive polymer; polyamide based polymer; olefin based adhesive; metal foil layer; olefin based adhesive polymer; and an exterior polyamide based polymer layer.

A suitable multi-layer packaging film having four layers is constituted by an interior heat sealable layer; exterior layer of polyester or polyamide resin; a central structural barrier layer, preferably metal foil, with an adhesive bonding polyolefin layer disposed between the barrier layer and the exterior layer.

Oxygen scavenging agents may be selected from a group of metal oxides, carbides, hydroxides, carbonates, sulfites, carbonyls, silicides, and mixtures thereof. One particularly suitable oxygen scavenging agent comprises fine particles of copper oxide supported on particles of aluminum. Where the oxygen scavenging agent is incorporated into one of the polymeric layers, it may be so combined by mixing together pellets of polymeric material and particles of a metal compound having a reducing property, such as copper oxide, and then extruding such mixture to form a sheet thereof.

In the case where the oxygen scavenging agent is incorporated between layers, it is preferred that such agent be incorporated closest to the foil and between the polyethylene and nylon layers in an exemplary seven layer configuration. Where the oxygen scavenging agent is to be incorporated into and extruded with one of the polymeric layers, it is preferred that it be coextruded with polyethylene polymer. It is preferred that the scavenger should not absorb or absorb the solvent associated with the battery.

Accordingly, it is an object of the present invention to provide an improved electrochemical battery assembly which maintains integrity of the battery over a prolonged life cycle as compared to presently used battery assemblies. Another object is to provide a container for such battery which includes an agent to take up oxygen or oxygen and water preventing attack of the reactive components of a cell or battery.

These and other objects, features, and advantages will become apparent from the following description of the preferred embodiments, appended claims, and accompanying drawings.

DETAILED DESCRIPTION OF THE PREFERRED EMBODIMENTS

Figure 1:
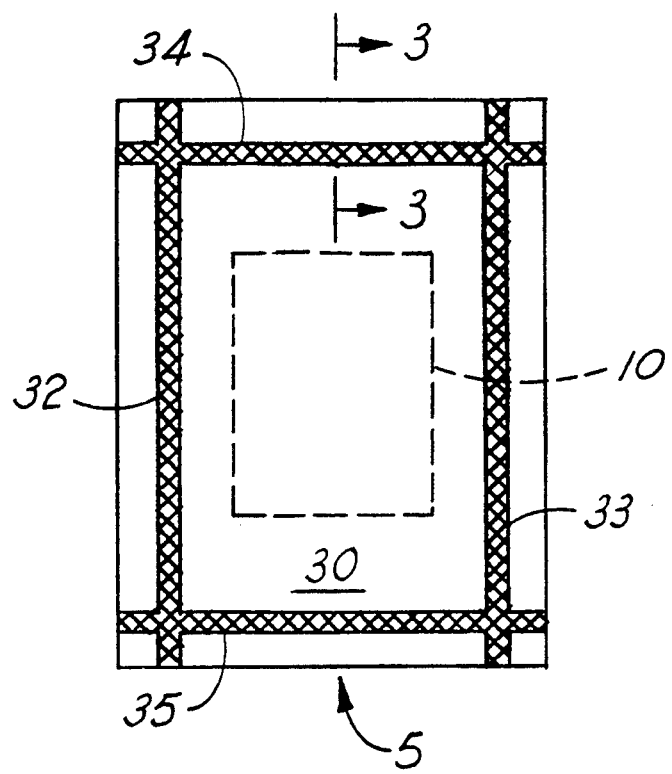
FIG. 1 is a front plan view of a container in the form of a bag constructed in accordance with the present invention.
Figure 2:
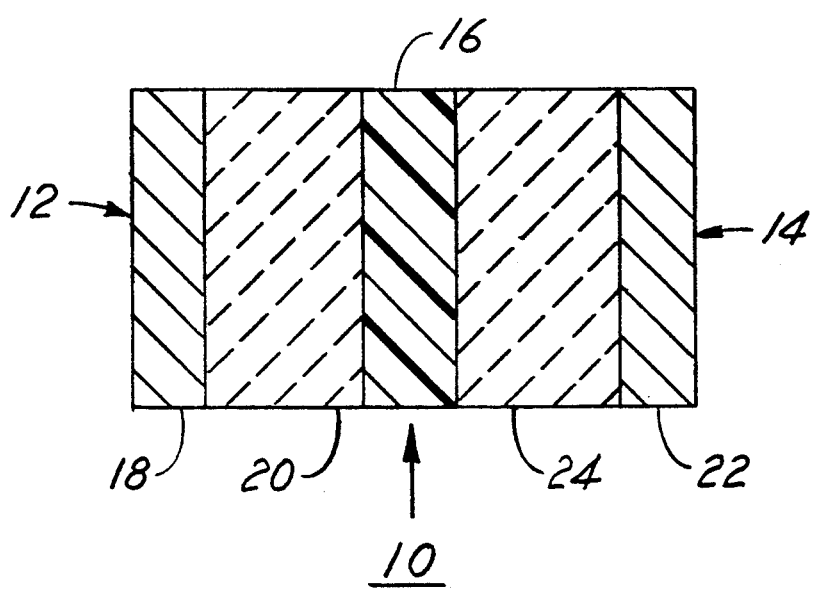
FIG. 2 is an illustration of a cross-section of a cell 10 in a container 5 embodying the invention.

As shown in the drawings, in one embodiment the battery assembly is composed of a protective covering or container 5 which houses an electrochemical cell or a battery 10. (FIG. 1) Battery 10 has a negative electrode side 12, a positive electrode side 14, and a separator 16 therebetween (FIG. 2). In accordance with common usage, a battery may consist of one cell or multiple cells. The negative electrode is the anode during discharge, and the positive electrode is the cathode during discharge. The negative electrode side includes current collector 18, typically of nickel, and/or copper foil, and a body of negative electrode active material 20. The positive electrode side includes current collector 22, typically of aluminum, nickel, and/or copper foil, or such foils having a protective conducting coating foil, and a body of positive electrode active material 24.

Cell 10 is preferably a laminar thin cell type including a lithium anode (negative electrode 20). Laminar thin-cell batteries containing lithium anodes are know in the art, and it will be appreciated that the cell can include various constructions such as bi-faced or bi-polar cell designs. Examples of cell constructions include a "jelly roll" or a fan folded laminate strip design as described in U.S. Pat. Nos. 4,879,190 and 4,935,317 incorporated herein by reference in their entirety.

Because the cell often utilizes a lithium anode layer 20, it is necessary to manufacture the cell in a water (humidity) free environment. Lithium is extremely reactive with nitrogen, oxygen and water and if reacted, a passivation layer can form on the surface of the anode layer, reducing the efficiency of the layer, and increasing cell impedance. Accordingly, it is particularly desirable to manufacture the cell in an environment having as little water, nitrogen and oxygen as possible and to maintain such an environment during use. The container 5 of the invention provides barriers to oxygen or oxygen and water and provides a means for scavenging any oxygen which may penetrate through exterior walls of the container.

The peripheral wall of container 5 is sufficiently thick to provide barrier properties and structural integrity to prevent damage to the cell contents but not so thick as to add undue weight which would negatively affect specific performance of the battery 10 housed within the container 5. Given this balance, some diffusion of oxygen into the battery 10 occurs despite attempts to select oxygen diffusion inhibiting material for the container. Therefore, the invention provides an oxygen scavenging compound to prevent diffusion of oxygen through the relatively thin wall of the container 5. The diffused oxygen reacts with an oxygen scavenging compound disposed in or between layers of the wall and is thereby absorbed by, or reacts with, the compound so that such oxygen is unavailable for diffusion into the chamber of the container 5 housing the battery 10. It is preferred that a water scavenging agent also be included. Further, some oxygen scavenging agents are activated by moisture or rendered more effective in the presence of moisture. Therefore, the invention, in one embodiment, prevents diffusion of oxygen and in another embodiment, prevents diffusion of oxygen and water. Thus is provided a battery assembly having stable components even over prolonged periods of time.

Figure 3:
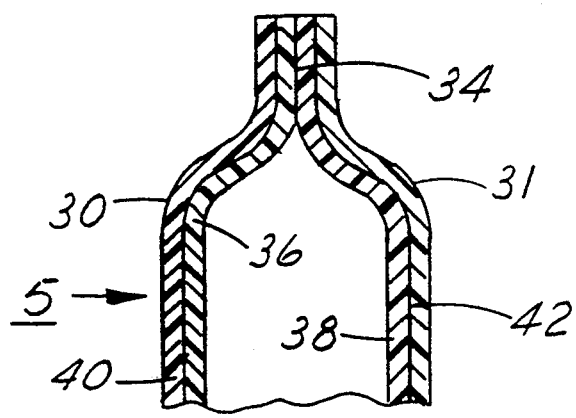
FIG. 3 is a cross-sectional view of the bag of FIG. 1 taken across the section line 3—3 in FIG. 1.

The specific construction of the peripheral wall and its several layers will now be more particularly described. The film of the invention is in the form of a laminate which is protective, is insulating, and inhibits transport of electricity, oxygen, and water therethrough. The laminate comprises one or more flexible electrically insulating and adhesive polymeric layers characterized by stability to water. One of the polymeric layers is an ionomeric layer which forms a heat seal to another layer of the laminate and the laminate includes an oxygen scavenging agent incorporated in one of the layers or disposed between two layers of the laminate. FIG. 1 is a front plan view of a container 5 in the form of a bag having layers (FIGS. 3, 4 and 5) constructed in accordance with the present invention.

Referring to the figures, there is illustrated therein a plastic container 5 consisting of a front panel 30 and a rear panel 31, which are heat sealed to one another along their sides, top, and bottom by heat seals 32, 33, 34, and 35, respectively, to contain a battery 10.

Each of the panels 30, 31 consist of a laminate of at least two superimposed flexible layers, where the layers facing one another in the bag will hereinafter be referred to as "interior layers," while the layers facing away from one another and facing the exterior of the bag will be designated as the "exterior layers." At a minimum, each panel consists of two layers. Panels 30 and 31 have facing interior layers 36, 38 and respective exterior layers 40, 42. In a preferred embodiment, each of the panels 30, 31 consist of more than two layers (see FIGS. 4 and 5).

In accordance with the invention, the interior layers 36, 38 are formed of a flexible ionomer material which readily heat seals to itself so that the heat seals 32, 33, 34, and 35 are strong. The panels 30, 31 are heat sealed to one another by means commonly employed in the art, such as by use of heat bars maintained at temperatures ranging between about 400° F. to 475° F. (204° C. and 246° C.) along a heat sealed line. A region at the top of the bag may be initially left unsealed so that the battery may be placed therein and then such opening may thereafter be heat sealed in accordance with the invention to form a closed bag or pouch-type of container 5.

Each of the panels 30 and 31 in FIG. 1 are formed of two layers. It is preferred that each of the panels 30, 31 are formed of more than two flexible layers. (FIG. 4) The outside of the bag 5 formed of flexible outer layers 40, 42 are of a plastic resin material, desirably a polyester or polyamide resin and preferably polyethylene terephthalate or nylon. These outer plastic resin layers 40, 42 provide protection for central structural barrier layers 44, 46. The preferred central structural barrier layers 44, 46 may be formed of a flexible metallic foil, such as aluminum foil. These central barrier layers 44, 46 have low permeability to both air and water. The outer plastic resin layers 40, 42 are respectively laminated to the central structural barrier layers 44, 46 by means such as extrusion or adhesive bonding. Preferably, adhesive bonding, employing a thermal setting polyolefin adhesive is used. In this example, a central structural aluminum foil layer 44 is laminated (heat sealed) on its inner surface to the heat sealable ionomeric layer 36 which forms the inside of the bag. Polyethylene (polyolefin) layer 50 is interposed between the central structural metallic barrier layer 44 and the plastic resin outer layer 40 to effect an adhesive bond therebetween and also to provide electrical insulation. A similar or identical polyolefin layer 52 is interposed between layers 46 and 42 also to provide an adhesive bond therebetween and for electrical insulation. Preferably the olefin adhesive polymer is polyethylene and particularly low density polyethylene. If desired, a layer of polyethylene may be placed at any location between layers 36 and 40.

Each sealable layer 36, 38 is selected because of its ability to reliably form hermetic heat seals. The term "hermetic" as used herein refers generally to essentially gas tight seals where passage of, for example, atmospheric gases is minimized. For purposes of the present invention, the composition of the layer 36, 38 is not so important as is its capacity to form seals which has strength sufficient for hindering its peeling apart at the seals. In construction of the sealed film package, there are known two general types of seal structure. In the first type, the seal extends to the outer edge of the package such that the entire edge of the package functions as a single film. In the second type, the seal extends from a location which is inward of the edge of the film and then outwardly toward a location on the film which is short of the edge such that the far edges of the film are not sealed together. Either embodiment is suitable so long as seals 32, 33, 34, and 35 are tight.

Each heat sealable layer 36, 38 may be of Surlyn, an ionomer resin, which is an ionic cross-linked ethylene-acrylic copolymer containing metallic ions from groups one or two of the Periodic Table and is commercially available from DuPont. A Surlyn A ionomer is available as DuPont A1601 resin which has a rated density of 940. This material has good stress, crack, and abrasion resistance which is desirable in the packaging of articles, particularly batteries.

It is known that a combination of Surlyn and polyethylene is available as a laminate to form heat sealable layers 36, 38 with, for example, Surlyn A having a thickness of about 1 mil (25 microns) and the polyethylene having a thickness of about 2 mils. It is known that Surlyn in combination with polyethylene may be formed in any of a variety of manners as by dual extrusion in a typical laminating dye. They may be blown films in the form of a web. It is known that the Surlyn polyethylene laminate has a seal strength of about 250 grams per square centimeter, with a bond strength between the Surlyn and the polyethylene being somewhat less than the seal strength between the Surlyn layers themselves. Thus, the lamination will fail before the seal between the two panels can be pried apart. Heat sealable layers may also be formed of a blend of plastic resins. Examples are polypropylene or Polyethylene-polypropylene copolymer blended with the ionomer resin, Surlyn, or an ethylene methyl methacrylate resin.

Figure 4:
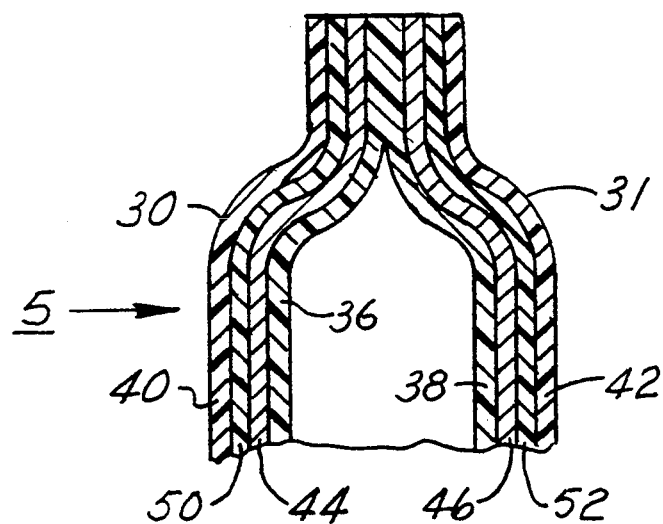
FIG. 4 shows a cross-section of the layers of another embodiment of the invention.
Figure 5:
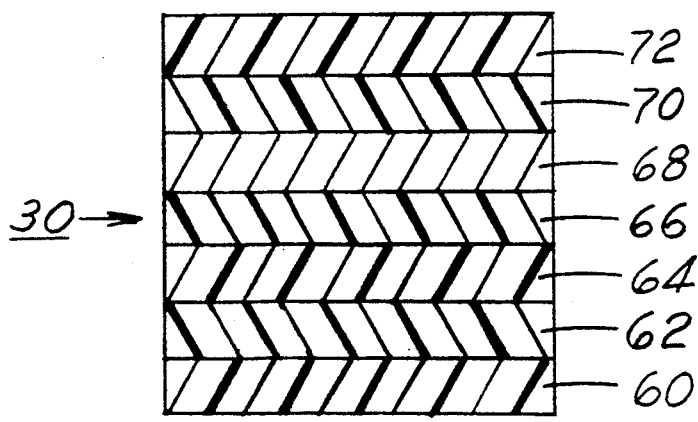
FIG. 5 shows a cross-section of the layers of still another embodiment of the invention.

Multiple layer packaging film construction suitable for retention of a battery therein will now be described with reference to two embodiments which have been found to be useful. The first being a desirable construction as illustrated in FIG. 4 comprising four flexible superimposed layers and the second being a preferred construction comprising seven flexible superimposed layers. In each case, the film forming the two sides of the bag type container are essentially the same and the seven layer construction will be described with reference to one side 30.

In a preferred embodiment, the film comprises seven flexible layers. (30, FIG. 5) The first layer of film 30 is an interior heat sealable layer of ionomer 60. A second layer 62 is an olefin based adhesive polymer adjacent the first layer with good adhesion thereto and to a third layer 64 adjacent the second layer. The third layer 64 has a composition of a polyamide-based polymer, such as nylon, or polyethylene terephthalate. A further layer 66 adjacent the third layer is an olefin based adhesive polymer with good adhesion to layer 64 and a fifth layer 68. The fifth layer 68 adjacent the fourth layer 66 is a metal foil, so that the metal foil layer 68 is sandwiched between olefin adhesive layers 66, 70. A sixth layer 70 adjacent the fifth layer 68 is an olefin based adhesive polymer which is adhered to the foil layer 68 and to a seventh exterior layer 72 which is a polyamide based polymer, such as nylon. It is preferred that each of the polyolefin layers 62, 66, 70, be low density polyethylene for good adhesive and electrical insulating characteristics; each of the polyamide layers, 64, 72 be nylon; the interior layer 60 be Surlyn and the metal foil 68, be aluminum.

The layers of each film are all juxtapositioned, respectively, in face-to-face contact with their adjacent layers and are bonded together by layers 62, 66 and 70 with adhesion adequate for the integrity of the multilayer film and the package formed therefrom. The film is easily made into a flexible bag or pouch having the combination of properties of hermetic seal, good oxygen, and moisture vapor barriers, and good durability.

Characteristics of Film Layers

The polyamide based polymer layer is one having a substantial reoccurrence of amide-type molecular sub-groupings. Among the preferred polyamide based polymers are the various nylon polymers. Such polyamide materials have gas barrier properties and such good gas barrier resins have 5 to 50 amide groups, especially 6 to 20 amide groups, per 100 carbon atoms, such as nylon 6, nylon 6,6; a nylon 6/6,6 copolymer, poly-m-xylylene adipamide, nylon 6, 10, nylon 11, 12, and nylon 13.

The term nylon is a generic term for any long chain polymeric amide which has recurring amide units—CONH—as an integral part of the main polymer chain. The term does not refer to a particular product but rather to a family of chemically related materials which may be fabricated and used in different physical forms. The various physical forms have in common the ability to be molded or extruded. Outstanding characteristics are toughness over a wide range of temperatures; strength in thin sections; resilience; abrasion resistance; good load bearing characteristics; dimensional stability at temperatures as high as 275° F.; relatively low specific gravity; generally good resistance to chemicals and solvents; good dielectric properties; and resistance to alkali solutions, to oxygen and to ozone and to non-oxidizing acids. Shorthand nomenclature of nylons involves the use of numbers: a single numeral indicating the number of carbon atoms in a monomer; two numbers indicating a polymer form from diamines and dibasic acids, the first numeral indicating the number of carbon atoms separating the nitrogen atoms of the diamene, the second indicating the number of straight chain carbon atoms in the dibasic acid, for example, nylon 6, 6. The exterior layer is selected to be of nylon or polyethylene terephthalate characterized by their ability as an abuse resistant layer. Ethylene vinyl alcohol may also be used but it is not preferred due to the presence of OH groups.

A preferred composition for each of the adhesive layers is polyethylene, particularly low density polyethylene (LDPE). The polyethylene also functions as a barrier to transmission of water vapors. The adhesive polyethylene is relatively light weight. There are three density grades of high molecular weight polyethylene material: low density, medium density, and high density. Low density material uses polymerization of ethylene at 1000 to 2500 atmospheres and temperatures of 100° C. to 300° C. in the presence of a peroxide catalyst. The term polyethylene usually refers to the high molecular weight materials (molecular weight greater than 6000). In the method of the invention among the high molecular weight materials is preferred the low density materials described above. Copolymers of polyethylene are also widely used and are sometimes referred to as polyethylene even though it may comprise only 50% of the total material. These resins have outstanding electrical characteristics and essentially impermeability to water as well as being generally resistant to organic solvents and chemicals particularly acids, alkalies and oxygenated solvents. They remain flexible at low temperatures. Polyethylene has good resistance toward acids, alkalies, grease, oils, and organic solvents. It has a tensile strength of 1400 to 2600 psi and a low water absorption over a 24 hour period of less than 0.001% and a low rate of transmission of water vapor. It is a good electrical insulator, and has a surface resistancy of about $10^{14}$ ohms.

Polyethylene terephthalate (PET, Mylar) is a polyester resin which has a melting point of about 265° C. and a second order transition temperature of 70° C. to 80° C. It is produced as oriented films or fibers characterized by high strength, good electrical properties, and resistance to moisture. It is useful in temperature environments from −60° C. to 150° C. and is used as electrical insulation and as a vapor barrier.

In summary, the properties of the preferred layer materials are as follows: gas barrier resin made of polyamides, nylon; moisture resistant (low water absorption) olefin resins made of low density polyethylene and polyethylene terephthalates; adhesive resin used in laminates made of olefin polymer, polyethylene; and gas and moisture barrier made of metal foils, such as aluminum. The oxygen barrier properties of the bag will now be described.

Oxygen Absorbers and Scavengers

Many oxygen scavenging agents may be used in the invention. For example, oxygen scavengers customarily used in the field of food and drug preservatives can be used as the oxygen scavenger in the present invention. In general, an oxygen scavenger having a reducing property and being substantially insoluble in water is preferably used. For example, an oxygen scavenger comprising as the main component at least one member selected from the group consisting of metal powders having a reducing property, such as reducing iron powder, reducing zinc powder and reducing tin powder, low-valence metal oxides such as ferrous oxide and triiron tetroxide, and reducing metal compounds such as iron carbide, iron silicide, iron carbonyl and iron hydroxide. The oxygen scavenger can be used in combination with an assistant such as a hydroxide, carbonate, sulfite, thiosulfate, tertiaryphosphate, secondary phosphate, organic acid salt or halide of an alkali metal or alkaline earth metal, or active carbon, active alumina or activated clay according to need.

Furthermore, a high-molecular-weight compound having a polyhydric phenol in the skeleton, such as a polyhydric phenol-containing phenol/aldehyde resin, can be used as the oxygen scavenger. In general, it is preferred that the oxygen scavenger should have an average particle size smaller than 10 microns, desirably smaller than $4 \times 10^{-5}$ meter (micron), especially smaller than $1 \times 10^{-6}$ meter (micron).

Some oxygen absorber materials are triggered by the presence of even a small amount of humidity in the air. Examples are sulfide salts such as potassium sulfite which becomes highly oxygen attractive (oxophilic) in the wet state. The oxygen scavenger potassium sulfite ($K_2SO_3$) may be mixed with a carrier material. Another gas absorption composition consists of fine particles of copper oxide supported on particles or spheres of high surface area alumina. In the reduced state, copper oxide is a highly effective oxygen scavenger capable of eliminating up to 99% of oxygen present in gases which may penetrate the laminate. One such copper based oxygen absorber is available from Engelhard of Elyria, Ohio under the designation CU-0226 in 14 to 20 mesh spheres which would need to be ground to about 10 microns and which have typical properties as listed below in Table I:

TABLE I

| Typical Properties | |
|---|---|
| Surface Area, m²/gm | 200 |
| Total Pore Volume, cm³/gm | 0.50 |
| Packed ABD, g/cc | 0.81 |
| Copper oxide, wt % at 250° C. | 10.0 |
| Nickel oxide, wt % at 250° C. | 0.4 |
| Color-grayish green to black | |

In one embodiment, pellets of a copolymer used in one of the layers of the laminate is mixed with an oxygen scavenger such as the CU-0226 in a batch wise, high speed, stirring vane-type mixture. The mixture may then be pelletized by a pelletizer comprising an extruder having a screw. A multi-layer laminate comprising the pelletized mixture and other layers may be produced by a multi-layer sheet forming machine comprising extruders for the various layers which are then formed in a suitable dye, cooled on a cooling roller, and advanced by means of a take-up device. In another embodiment, the oxygen scavenger, in its particle form, may be placed between the extruded layers before they are laminated together in the dye. Thus, the films of the invention are preferably made by coextrusion process, though other processes are acceptable so long as the resulting film is functionally integral for the life of the package and prevents intrusion of oxygen into the compartment occupied by the battery.

A water absorbing agent may also be used in combination with the oxygen scavenger. Some oxygen absorbing agents are activated by water or their effectiveness is increased in the presence of water. A deliquescent inorganic salt or organic compound may be used in the invention as well as water absorbing resins. Examples of such compounds and resins include sodium, calcium, zinc and ammonium chlorides, sulfates and nitrates; and organics such as starch, cellulose, sugars, and organics having a carboxyl group and a cross-linked structure. Other examples are silica, alumina, silica-alumina and gels thereof. The combination of a metal oxide and alumina, as described above with copper oxide supported on alumina, is particularly suitable. In the case of potassium sulfite, it may be replaced by an interacting mixture of potassium acetate and sodium sulfite where moisture is taken up by such interacting mixture to form the potassium sulfite which is an oxygen absorber. Many metal oxides such as iron oxides react in the presence of moisture with gaseous oxygen to form higher oxidation state metal oxides and halides. A typical example is $Fe(OH)_2 + \frac{1}{4}O_2 + \frac{1}{2}H_2O = Fe(OH)_3$. Thus, ferrous (Fe+2) form of iron reacts in the presence of moisture with oxygen to produce the ferric (Fe+3) form of iron. Still other examples of oxygen scavengers are sodium dithionite, metal halides and combinations of compounds such as an iron containing sulfur combined with a metal halide. The various oxygen and oxygen and water scavenging products are more particularly described in the following U.S. patents, which are each incorporated herein by reference: U.S. Pat. Nos. 3,117,259, 4,702,966, 5,077,111, 5,153,038, 4,840,280, 5,143,763, and 4,856,650.

In the case of the exemplary seven layer construction, it is preferred that the overall thickness of the laminate be as thin as possible to minimize overall thickness of the cell. Heat sealable laminate of the type described above can have an overall thickness of less than about 500 microns. It is preferred to achieve a thickness of less than about 250 microns. This is achievable if the thickness of each of the 7 layers is on the order of about 20–30 microns and the scavenger is at least a monolayer with a particle size of about 10 microns or less.

It is also preferred that in the formation of heat seals, the two Surlyn ionomer layers are brought together with heat and pressure such that the layers are softened and essentially fused together. Sealing strength is accomplished and enhanced by homogeneity and internal cohesiveness of the layers. A well-formed Surlyn seal has essentially no interface between the two sealed layers so that the sealed Surlyn layers appear to function as a single layer joining the two films which form the side of the package as shown in the figures.

While this invention has been described in terms of certain embodiments thereof, it is not intended that it be limited to the above description, but rather only to the extent set forth in the following claims.

The embodiments of the invention in which an exclusive property of privilege is claimed are defined in the appended claims.

I claim:

1. A laminate, for use as a protective, insulating covering or wrap for an electrochemical battery or cell, the laminate capable of inhibiting transport of electricity, oxygen, and water therethrough which comprises:
   a. a first layer which is a polymeric metal-containing ionomeric cross-linked ethylene-acrylic copolymer, said layer forming a heat seal when two portions of the laminate are heat sealed together to form said covering or wrap;
   b. a second layer which is a metal foil layer;
   c. a third layer which is a polymeric layer of a polymeric amide or a polyester;
   d. a fourth layer which is a polymeric adhesive polyethylene layer between the metal foil layer and the third layer;
   e. each of said polymeric layers being essentially devoid of hydroxide pendent groups;
   f. an oxygen scavenger incorporated in one of said polymeric layers or disposed between layers of the laminate; and
   g. said first layer being on one side of said second layer and said third layer being on the other side of said second layer.

2. The laminate according to claim 1 wherein the oxygen scavenger comprises a metal compound having a reducing property.

3. The laminate according to claim 1 wherein the oxygen scavenger comprises particles of copper oxide mixed with particles of alumina.

4. The laminate according to claim 1 wherein the oxygen scavenger is incorporated into one of the polymeric layers by mixing together pellets of the polymeric material forming said one of said polymeric layers and particles of a metal compound having a reducing property and then extruding such mixture to form a sheet thereof.

5. The laminate according to claim 1 wherein the oxygen scavenger is selected from the group consisting of metal oxides, metal carbides, metal carbonates, metal sulfites, metal carbonyls, metal silicides, and mixtures thereof.

6. The laminate according to claim 5 wherein the oxygen scavenger further comprises one selected from the group consisting of non-metal carbonates, sulfates, carbon, alumina, clay, and mixtures thereof.

7. The laminate according to claim 1 wherein the oxygen scavenger is between the first layer and the metal foil layer.

8. The laminate according to claim 1 which is in the form of a single sheet, folded over onto itself with the heat sealable layer sealed to itself on three sides.

9. An article comprising tow superimposed laminates according to claim 1 which have been heat sealed together along four edges.

10. A laminate, for use as a protective, insulating covering or wrap for an electrochemical battery or cell, the laminate capable of inhibiting transport of electricity, oxygen, and water therethrough which comprises:
   a. a first layer which is a metal-containing ionomeric cross-linked ethylene acrylic copolymer, said layer forming a heat seal when two panels of the laminate are heat sealed together to form said covering or wrap;
   b. a second layer which is low density polyethylene layer;
   c. a third layer which is a nylon layer;
   d. a fourth layer which is a second low density polyethylene;
   e. a fifth layer which is an aluminum foil layer;
   f. a sixth layer which is a third low density polyethylene layer;
   g. a seventh layer which is a second nylon layer;
   h. each of said polymeric layers being essentially devoid of hydroxide pendent groups;

i. an oxygen scavenger incorporated in one of said polymeric layers or disposed between layers of said laminate; and wherein j. said second layer is between said first and third layers; said third layer is between said second and fourth layers; said fourth layer is between said third and fifth layers; said fifth layer is between said fourth and sixth layers; and said sixth layer is between said fifth and seventh layers.

11. The laminate according to claim 10 wherein the oxygen scavenger comprises a metal compound having a reducing property.

12. The laminate according to claim 10 wherein the oxygen scavenger comprises fine particles of copper oxide mixed with particles of alumina.

13. The laminate according to claim 10 wherein the oxygen scavenger is incorporated into one of the polymeric layers by mixing together pellets of polymeric material and particles of a metal compound having a reducing property and then extruding such mixture to form a sheet thereof.

14. The laminate according to claim 10 wherein the oxygen scavenger is selected from the group consisting of metal oxides, metal carbides, metal carbonates, metal sulfites, metal carbonyls, metal silicides, and mixtures thereof.

15. The laminate according to claim 14 wherein the oxygen scavenger further comprises one selected from the group consisting of non-metal carbonate, sulfates, carbon, alumina, clay, and mixtures thereof.

16. The laminate according to claim 10 wherein the oxygen scavenger is between the first-layer and the metal foil layer.

17. The laminate according to claim 10 which is in the form of a single sheet, folded over onto itself with the heat sealable layer sealed to itself on three sides.

18. An article comprising two superimposed laminates according to claim 10 which have been heat sealed together along four edges.

* * * * *